United States Patent Office

Re. 25,566
Reissued Apr. 28, 1964

25,566

ANODIC OXIDATION OF ALUMINUM

Bruce E. Deal, Palo Alto, Calif., and Larry Swanson, Coeur d'Alene, Idaho, assignors to Kaiser Aluminum & Chemical Corporation, Oakland, Calif., a corporation of Delaware No Drawing. Original No. 3,031,387, dated Apr. 24, 1962, Ser. No. 857,562, Dec. 7, 1959. Application for reissue Sept. 18, 1963, Ser. No. 309,908
7 Claims. (Cl. 204—58)

Matter enclosed in heavy brackets [ ] appears in the original patent but forms no part of this reissue specification; matter printed in italics indicates the additions made by reissue.

This invention relates to oxide coatings on aluminum metal. This application is a continuation-in-part of our co-pending application Serial Number 799,089, filed March 13, 1959, *which was a continuation-in-part of then copending application, Serial No. 728,090, filed April 14, 1958, both* now abandoned.

For many purposes aluminum surfaces are protected by an oxide coating produced on the surface by exposure as an anode in an acid electrolyte capable of yielding oxygen on electrolysis, such as an aqueous solution of sulfuric acid. The operation of forming such coatings is commonly termed "anodizing" and the aluminum surface thus protected is commonly termed "anodized." Electrolysis in solutions of sulfuric acid with direct or alternating current generally provide colorless to grayish layers of oxide coating on aluminum. The abrasion resistance of these layers is in general not very great which can be demonstrated by the fact that the oxide layer can generally be scraped off with a knife. It has long been desired to produce abrasion resistant oxide layers and to produce colored oxide coated aluminum surfaces. In the past, however, abrasion resistant oxide layers were produced only by anodizing at low temperatures, i.e. from about 0° to 30° F. Such process possesses certain inherent disadvantages particularly with regard to the necessity for expensive refrigeration equipment to maintain the coating bath at temperatures below 30° F.

With regard to producing colors on oxide coated aluminum surfaces, in the past it has been necessary to first anodize the aluminum metal base and thereafter dye the anodic coating with organic dye. Another prior art process for producing colored aluminum surfaces is the ferric oxalate hydrolysis process which deposits ferric oxide or hydrate in the pores of the anodic coating. This process requires first anodizing the aluminum metal base followed by immersion of the anodized aluminum in a solution of ferric ammonium oxalate at controlled concentration, temperature and pH. A third means for producing colored aluminum surfaces involves the double precipitation of an insoluble colored inorganic compound. Such processes possess certain inherent disadvantages particularly with regard to the number of processing steps required to produce a colored surface. For example such prior art processes require the anodized metal to be subjected to at least one additional processing step in order to color the anodic coating. In addition where the color is produced by impregnating the anodic coating with a dye, the colors tend to fade rapidly when exposed to ultraviolet light.

It has been discovered according to the present invention that an abrasion resistant oxide coating on aluminum metal can be produced at temperatures which do not necessitate subjecting the anodizing bath to refrigeration. For example, temperatures in the range of 55 to 85° F. have been found quite satisfactory. Further, it has been discovered that colored oxide coated aluminum metal surfaces characterized by pleasing appearance and superior light fastness can be produced without subjecting the coated surfaces to a separate coloring treatment. The colors are produced during production of the oxide coating in a bath with special reagents but wherein no dyes or pigments are used.

The aluminum metal is subjected to anodic oxidation in an aqueous solution consisting essentially of sulfosalicylic acid and at least one substance selected from the group consisting of metal sulfates and sulfuric acid, balance water. The aluminum metal may comprise a single layer or multiple layers of the same or differing aluminum metals bonded together.

In general the electrolytes of this invention consist essentially of an aqueous solution of from about 5 to 50% by weight of sulfosalicylic acid and at least one substance selected from the group consisting of metal sulfates and sulfuric acid in an amount equivalent to not more than 15% by weight sulfuric acid. Of the recited group it is presently preferred to use sulfuric acid. Even a small amount of metal sulfate or sulfuric acid is beneficial to the electrolyte embodying the principles of this invention, e.g. an amount of metal sulfate or sulfuric acid equivalent to 0.1% by weight of sulfuric acid is beneficial. The preferred ranges are from about 7 to 15% by weight sulfosalicylic acid and an amount of metal sulfate or sulfuric acid equivalent to from about 0.3 to 4% by weight sulfuric acid. It has been found that anodic coatings on samples of various aluminum alloys anodized in electrolytes having compositions within the broad ranges recited above have superior abrasion resistance as demonstrated by the fact that the coatings cannot be easily scraped off with a knife.

A distinct advantage of the present invention is the production of abrasion resistant oxide coatings at bath temperatures such as 55 to 85° F. rather than at freezing temperatures, i.e. 0°–30° F. required by prior art methods wherein expensive refrigeration is needed. Further, depending on the aluminum base alloy and the composition and concentrations of the electrolyte employed, various shades of various colors may be produced. In general the coatings produced are uniform.

For the anodic treatment of the aluminum metal in the bath or electrolyte according to the present invention, there can be provided either direct current or, if desired, a combination of direct current and alternating current.

While abrasion resistant coatings equivalent to those produced by prior art processes are produced with the method and electrolyte of this invention at temperatures such as 55 to 85° F., both higher and lower temperatures may be employed. Moreover, it has been found that with lower temperatures even harder coatings are produced.

Depending upon the lustre or brightness of the aluminum metal desired, that is the degree of specular reflectance, the aluminum metal may be subjected to various pretreatments prior to anodizing. For example, where high lustre or brightness is desired the base metal may be subjected to conventional polishing or brightening treatments, e.g. mechanical, chemical or electrochemical.

Where it is desired that the ultimate article have a matte or satin appearance, the base metal can be subjected to a suitable etching treatment. Examples of satisfactory pretreatment and anodizing procedure utilizing the novel electrolyte embodying the principles of this invention are set forth below, it being understood that the conventional water rinsing operations after various steps are not recited.

(1) Clean metal in an inhibited alkaline cleaner. An example of one suitable cleaning solution is one composed of 40 grams per liter sodium carbonate, 20 grams per liter trisodium phosphate, 5 grams per liter sodium metasilicate, balance water. The solution may be maintained at a temperature of about 160° F.

(2)(a) Where high lustre or brightness of the ultimate composite is desired, treat metal according to a suitable bright dip process such as that described in U.S. Patent No. 2,719,781.

(b) Where a matte appearance is desired in the ultimate composite, subject material to a suitable etch treatment, e.g. in a solution of 5% sodium hydroxide plus 2% sodium fluoride maintained at a temperature of 160° F. for a 5-minute immersion period.

(3) Rinse in 50% by volume nitric acid solution.

(4) Anodize for 1 to 150 minutes in an electrolyte consisting essentially of an aqueous solution of from 7 to 15% by weight sulfosalicy[c]lic acid and at least one substance selected from the group consisting of metal sulfates and sulfuric acid in an amount equivalent to from about 0.3 to 4% by weight of sulfuric acid at temperatures of from about 55 to 85° F. and at a current density of from about 10 to 100 a.s.f. (amperes per square foot) and voltages from about 20 to 120 volts. It is presently preferred practice to anodize with an initial current density of from about 20 to 30 a.s.f. and use voltages from about 25 to 70 volts. Anodizing times greater than 150 minutes can be used in certain instances. However, the length of time is to some extent controlled by the thickness of the aluminum article being treated since aluminum dissolves during anodizing. Where abrasion resistance is the primary consideration, it is presently preferred practice to use an electrolyte temperature in the range of from about 60° to 75° F. Where color is the primary consideration, it is presently preferred practice to use an electrolyte temperature in the range of from about 70° to 85° F. and an anodizing time of from about 10 to 60 minutes.

(5) If desired, the oxide coatings may be sealed by various treatments. For example, the anodized metal can be immersed in hot water maintained at a temperature of from 180° to 212° F. and having a pH of from 5 to 6 for a period of 10 to 30 minutes. Where abrasion resistance is the primary consideration and sealing desired, the aforementioned treatment is presently preferred. Another sealing procedure, and one presently preferred where color is the primary consideration and the aluminum contains a significant amount of copper, involves immersion for from about 0.5 to 10 minutes in an aqueous solution of from about 0.1 to 5% of common soaps or their components, e.g. mixtures of the sodium salts of fatty acids such as lauric, myristic, oleic, palmitic and stearic acids with the solution being maintained at a temperature in the range of from about 70° to 170° F. Where color is emphasized but the aluminum does not contain a significant amount of copper, and sealing is desired, the presently preferred practice is by immersion for a period of from about 10 to 25 minutes in a solution of water and a small amount of a sealing reagent and wherein the solution has a pH of from about 5.5 to 6.0 and is maintained at a temperature of from about 190 to 212° F. Examples of suitable solutions are: (1) 5 grams per liter nickel acetate, 1 gram per liter cobalt acetate, 5 grams per liter boric acid, 5 grams per liter desugared calcium lignosulfonate, balance water, and (2) 5 grams per liter nickel acetate, 1 gram per liter cobalt acetate, 8 grams per liter boric acid, 1 gram per liter condensation product of naphthalene sulfonic acid and formaldehyde.

In order to establish the superiority of the abrasion resistance of anodic oxide coatings produced in accordance with this invention and the composite article coated therewith over those produced by conventional prior art anodizing materials and electrolytes, tests described hereinbelow have been conducted.

In these tests samples were fabricated from sheets of various aluminum alloys (1100, 5052, 6061–T6 and 7075–T6) cut into 4" x 4" squares providing a total surface area of 32 square inches per sample. The alloys employed were commercial aluminum alloys with the ranges of constituents fixed by the Aluminum Association as indicated in Table I below:

TABLE I

| Alloy | Al | Cu | Fe | Si | Mn | Mg | Zn | Cr | Ti | Other Elements | |
|---|---|---|---|---|---|---|---|---|---|---|---|
| | | | | | | | | | | Each | Total |
| 1099 | 99.99 min | | | | | | | | | | |
| 1100 | 99.00 min | | | | | | | | | | |
| 2011 | Remainder | 5.0 –6.0 | 0.7 | 0.40 | | | 0.30 | | | 0.05 | 0.15 |
| 2014–T3 | do | 3.9 –5.0 | 1.0 | 0.50–1.2 | 0.40–1.2 | 0.20–0.8 | 0.25 | 0.10 | 0.15 | 0.05 | 0.15 |
| 2024–T3 | Bal | 3.8 –4.9 | 0.50 | 0.50 | 0.3 –0.9 | 1.2 –1.8 | 0.25 | 0.10 | | 0.05 | 0.15 |
| 3003 | Bal | 0.20 | 0.70 | 0.60 | 1.0 –1.5 | | 0.10 | | | 0.05 | 0.15 |
| 4043 | Bal | 0.30 | 0.80 | 4.5 –6.0 | 0.05 | 0.05 | 0.10 | | 0.20 | 0.05 | 0.15 |
| 5005 | Bal | 0.20 | 0.7 | 0.40 | 0.20 | 0.50–1.1 | 0.25 | 0.10 | | 0.05 | 0.15 |
| 5052 | Bal | 0.10 | (Total 0.45 Max.) | | 0.10 | 2.2 –2.8 | 0.10 | 0.15–0.35 | | 0.05 | 0.15 |
| 5086 | Bal | 0.10 | 0.50 | 0.40 | 0.20–0.7 | 3.5 –4.5 | 0.25 | 0.05–0.25 | 0.15 | 0.05 | 0.15 |
| 5357 | Bal | 0.07 | 0.17 | 0.12 | 0.15–0.45 | 0.8 –1.2 | | | | 0.05 | 0.15 |
| 6061–T6 | Bal | 0.15–0.40 | 0.70 | 0.4 –0.8 | 0.15 | 0.8 –1.2 | 0.25 | 0.15–0.35 | 0.15 | 0.05 | 0.15 |
| 6063–T5 | Bal | 0.10 | 0.35 | 0.20–0.6 | 0.10 | 0.45–0.9 | 0.10 | 0.10 | 0.10 | 0.05 | 0.15 |
| 7075–T6 | Bal | 1.2 –2.0 | 0.70 | 0.50 | 0.30 | 2.1– 2.9 | 5.1 –6.1 | 0.18–0.40 | 0.20 | 0.05 | 0.15 |

Prior to anodizing, the samples were subjected to the following pretreatment:

(1) Cleaned in an inhibited alkaline cleaner to water break free surface.

(2) Rinsed in cold water.

(3) Bright dipped according to the teachings of U.S. Patent No. 2,719,781 using a temperature of 200° F.

(4) Rinsed in 50% by volume nitric acid.

(5) Rinsed in cold water.

The samples were anodized for a period of 60 minutes in the electrolytes as set forth in Table II below, such electrolytes being designated according to the percentage of sulfosalicy[c]lic acid and sulfuric acid or ferric sulfate contained therein, the balance of each electrolyte being water. All percentages are by weight of the total electrolyte. The electrolytes were contained in a twenty liter rectangular battery jar equipped with stirring devices and lead cathodes. Anodizing power was supplied by two full wave selenium rectifiers in series.

All the samples were anodized with direct current at

72° F. The current densities employed were 27 a.s.f. for the samples anodized in the electrolytes of this invention and 12 a.s.f. for the samples anodized in the sulfuric acid electrolyte. Current densities appreciably higher than 12 a.s.f. generally cannot be employed commercially for anodizing in straight sulfuric acid electrolytes since the resulting coatings are unsatisfactory. It is presently preferred practice to maintain the current density constant during the anodizing operation. In general the voltages necessary to maintain a given current density vary with the cell and the anodizing conditions and the required voltage varies as the anodizing progresses. In anodizing the samples of Table II the voltages required to maintain a constant current density of 27 a.s.f. ranged from about 25 to 60 volts while the voltages required to maintain a constant current density of 12 a.s.f. ranged from about 12 to 16 volts.

The samples anodized in the sulfosalicylic acid-sulfuric acid anodizing baths were tested for abrasion resistance with an abrasive jet apparatus of the type recommended by the ASTM for testing abrasion resistance. This is described by Roberts A. G., Crouse W. A. and Pizer R. S., "Abrasive Jet Method for Measuring Abrasion Resistance of Organic Coatings." ASTM Bulletin No. 208, September 1955. With this apparatus abrasion resistance is measured by the time required to penetrate the coating and the results are given in Table II. In general for purposes of comparative data, several spots on each surface to be tested are abraded with the apparatus, the same number of spots being abraded on each sample. The comparative abrasion resistance is then measured by the total time required to penetrate all the spots of the sample. In Table II below, hardness is measured in terms of the total number of seconds required to penetrate ten spots on the sample.

It is readily seen from the results indicated above that the anodic oxide coatings produced on the aluminum base metal employing the electrolytes of this invention are superior in abrasion resistance to the oxide coatings produced with conventional sulfuric acid electrolytes. The above samples were characterized by attractive, light stable colors. However, for optimum results with regard to the production of colored surfaces on the aluminum alloys it is preferred to use an electrolyte with a sulfuric acid content of less than about 1%, e.g. .1 to 1%.

Further examples of the excellent abrasion resistance of the oxide coatings produced by practice of this invention involve tests conducted on alloys 1100, 5052, 6061 and 7075 having the following chemical compositions:

| Alloy | Al | Cu | Fe | Si | Mn | Mg | Zn | Cr | Ti | Ni |
|---|---|---|---|---|---|---|---|---|---|---|
| 1100 | Bal. | 0.14 | 0.56 | 0.11 | 0.01 | 0.00 | 0.02 | 0.01 | 0.01 | 0.005 |
| 5052 | Bal. | 0.07 | 0.21 | 0.08 | 0.03 | 2.49 | 0.10 | 0.21 | 0.01 | 0.005 |
| 6061 | Bal. | 0.25 | 0.45 | 0.70 | 0.08 | 1.04 | 0.15 | 0.25 | 0.06 | 0.005 |
| 7075 | Bal. | 1.70 | 0.33 | 0.15 | 0.10 | 2.46 | 5.54 | 0.26 | 0.05 | 0.006 |

In these tests the samples used were 4" x 6" x 0.040" in size. Prior to anodizing each sample was cleaned by immersion for about 5 minutes in an inhibited alkaline cleaner, rinsed in cold water, etched 5 minutes at 160° F. in a 5% sodium hydroxide solution, rinsed in cold water, de-smutted by immersion in a 50% by volume nitric acid solution at room temperature for 2 minutes and rinsed in cold water. The samples were anodized in various electrolyte compositions and under various time, current density, voltage and temperature conditions with resulting abrasion resistances as set forth in Table III.

TABLE III

| Alloy | Electrolyte | Temperature of electrolyte, ° F. | Initial current density, amps./ft.² | Final current density, amps./ft.² | Time to maximum volts, minutes | Maximum volts | Total anodizing time, minutes | Abrasion resistance |
|---|---|---|---|---|---|---|---|---|
| 5052 | (1) | 68 | 24 | 24 | 31 | 60 | 65 | 22.4 |
| 1100 | (1) | 68 | 24 | 9 | 23.5 | 65 | 120 | 32.1 |
| 5052 | (1) | 68 | 24 | 10.5 | 25.5 | 65 | 101 | 33.7 |
| 7075-T6 | (1) | 68 | 24 | 22.5 | 45 | 65 | 69.5 | 29.6 |
| 1100 | (2) | 68 | 24 | 19.5 | 55 | 65 | 60 | 24.6 |
| 5052 | (2) | 68 | 24 | 24 | ---------- | 60 | 60 | 25.2 |
| 1100 | (2) | 68 | 24 | 12 | 44 | 65 | 120 | 37.4 |
| 5052 | (2) | 68 | 24 | 9 | 54 | 65 | 116.5 | 31.6 |
| 7075-T6 | (2) | 68 | 24 | 24 | ---------- | 42 | 92 | 37.8 |
| 7075-T6 | (2) | 68 | 48 | 48 | ---------- | 52 | 31 | 27.9 |
| 7075-T6 | (2) | 68 | 60 | 60 | ---------- | 60 | 20 | 22.8 |
| 6061-T6 | (2) | 68 | 24 | 13.5 | 36.5 | 65 | 72 | 24.9 |
| 7075-T6 | (2) | 59 | 24 | 24 | ---------- | 49 | 45 | 22.1 |
| 1100 | (3) | 68 | 24 | 24 | ---------- | 45 | 60 | 24.4 |
| 1100 | (3) | 68 | 24 | 15 | 70 | 65 | 120 | 47.4 |
| 5052 | (3) | 68 | 24 | 19.5 | 93 | 65 | 110 | 45.4 |
| 6061-T6 | (3) | 77 | 24 | 24 | ---------- | 56 | 60 | 21.8 |
| 7075-T6 | (3) | 68 | 60 | 60 | 25 | 65 | 30 | 34.9 |
| 5052 | (4) | 68 | 24 | 24 | ---------- | 31.5 | 60 | 26.5 |
| 6061-T6 | (4) | 68 | 24 | 24 | ---------- | 46 | 60 | 23.6 |
| 1100 | (4) | 68 | 24 | 24 | ---------- | 64.5 | 120 | 48.5 |
| 5052 | (4) | 68 | 24 | 24 | ---------- | 47 | 120 | 53.5 |

[1] 10% by weight sulfosalicylic acid, 0.5% by weight sulfuric acid, balance water.
[2] 10% by weight sulfosalicylic acid, 1.0% by weight sulfuric acid, balance water.
[3] 10% by weight sulfosalicylic acid, 2.0% by weight sulfuric acid, balance water.
[4] 10% by weight sulfosalicylic acid, 3.0% by weight sulfuric acid, balance water.

TABLE II

Typical Aluminum Alloys Anodized in Electrolytes of This Invention and in Prior Art Sulfuric Acid Electrolyte

| Alloy | Abrasion resistance | | | |
|---|---|---|---|---|
| | 10% sulfosalicylic acid, 1% sulfuric acid electrolyte | 10% sulfosalicylic acid, 2% sulfuric acid electrolyte | 15% sulfosalicylic acid, 5% ferric sulphate electrolyte | 15% sulfuric acid electrolyte |
| 1100 | 33.0 | 19.0 | 27.9 | 11.5 |
| 5052 | 22.5 | 22.5 | 30.3 | 12.0 |
| 6061-T6 | 25.0 | 19.5 | 31.6 | 11.5 |
| 7075-T6 | 31.0 | 21.5 | ---------- | 7.0 |

The electrolytes were contained in 50-gallon, rubber-lined tanks and were circulated by means of mechanical stirring or air agitation. Power was supplied by a motor generator and perforated lead cathodes were used.

Specific examples illustrating colors obtained by anodizing various alloys, compositions of which are given in Table I, for thirty minutes in an electrolyte embodying the principles of this invention consisting of 10% sulfosalicylic acid, 0.5% sulfuric acid, balance water at 72° F. are given in Table IV. In anodizing the samples direct current was employed and the current densities were maintained at 27 a.s.f. The voltages required to maintain the current densities at 27 a.s.f. varied as anodizing progressed ranging from about 25 to 60 volts.

TABLE IV

Anodizing Characteristics and Colors Produced on Samples Anodized in a 10% Sulfosalicylic Acid 0.5% Sulfuric Acid Electrolyte

| Alloy: | General appearance |
|---|---|
| 1099 | Silvery gray. |
| 1100 | Tan. |
| 2011–T3 | Light blue gray. |
| 2014–T3 | Do. |
| 2024–T3 | Do. |
| 3003 | Dark gray black. |
| 4043 | Brown gray. |
| 5005 | Do. |
| 5052 | Golden Brown. |
| 6061–T6 | Jet black. |
| 7075–T6 | Dark blue black. |

As can be seen from the above table, alloys such as 2011, 2014, 2024 and 7075 containing material amounts of copper, e.g. 1 to 6% produce a blue color when anodized under the above conditions.

The anodized samples of Table IV were sealed for two minutes in a 1½% aqueous soap solution maintained at a temperature of 120° F.

The colors produced on the samples of Table IV were attractive and light stable. Tests made on samples of 5052, 3003 and 2024–T3 aluminum alloys anodized as above described have withstood 24,000 hours of ultraviolet exposure with no appreciable fading as determined by visual inspection and colormetric measurements. Similar exposure of 6061–T6 alloy for 8,000 hours has given the same results.

Further examples illustrating colors obtained by practice of this invention are set forth in Table V below which includes alloy designation, color, and operational conditions, i.e. initial current density, average time to maximum volts, maximum volts and total anodizing time. The samples used were in the form of a sheet or extrusions, the sheets ranging in size from about one foot square to four feet by eight feet. The extrusions used involved various typical cross-sectional shapes in lengths up to about 10 feet.

TABLE V

| Alloy | Color | Initial current density, amp/ft.$^2$ | Time to maximum volts, minutes | Maximum volts, | Total anodizing time, minutes |
|---|---|---|---|---|---|
| 5095 clad with 5005 (sheet) | Amber gray | 24 | 20 | 50 | 30 |
| Do | Charcoal brown | 24 | 35 | 60 | 45 |
| 1100 clad with 1100 (sheet) | Tan | 24 | 20 | 50 | 30 |
| Do | Olive | 24 | 30 | 60 | 45 |
| 024–T3 (sheet and extrusion) | Light blue | 12 | 15 | 65 | 45 |
| 003 clad with 3003 (sheet) | Dove gray | 24 | 10 | 50 | 20 |
| Do | Charcoal gray | 24 | 20 | 65 | 40 |
| 5086 (sheet) | Black | 24 | 25 | 65 | 40 |
| Do | Gray | 24 | 15 | 50 | 20 |
| 5052 (sheet) | Light bronze | 24 | 15 | 40 | 30 |
| Do | Golden brown | 24 | 35 | 60 | 45 |
| 5357 (sheet) | Light brown | 24 | 20 | 50 | 30 |
| Do | Brown | 24 | 30 | 60 | 45 |
| 6061–T6 (sheet and extrusion) | Antique bronze | 24 | 10 | 50 | 20 |
| Do | Jet black | 24 | 30 | 65 | 40 |
| 6063–T5 (extrusion) | Amber | 24 | 20 | 50 | 30 |
| Do | Light brown | 24 | 35 | 60 | 45 |

The examples shown in Table V were produced by using the following procedure:

(1) Cleaned by immersion for five minutes with agitation in a solution composed of 40 grams per liter sodium carbonate, 20 grams per liter trisodium phosphate, 5 grams per liter sodium metasilicate, balance water and maintained at approximately 160° F.

(2) Rinsed in cold water.

(3) Etched by immersion in a 5% sodium hydroxide (caustic soda) solution for five minutes at 160° F.

(4) Rinsed in cold water.

(5) De-smutted in a 50% by volume nitric acid solution at room temperature for two minutes.

(6) Rinsed in cold water.

(7) Anodized in electrolye or bath consisting of 10% by weight sulfosalicylic acid, 0.5% by weight sulfuric acid, balance water. The anodizing bath was maintained at a temperature of 77° F. In each example (with the exception of alloy 2024–T3), anodizing began with a current density of 24 amperes (D.C.) per square foot of work surface and the anodizing was continued at this current density until the cell voltage reached the value indicated in Table V under "Maximum volts" for the particular alloy and color involved. The work was held at the maximum voltage for the remainder of the anodizing time set forth in the subject table. Where color is the primary consideration, it is presently preferred practice to follow the aforesaid procedure, i.e. start with and maintain a selected current density value until such time as the voltage reaches a selected maximum value and then conduct the remaining anodizing period at such voltage.

(8) Rinsed in cold water.

(9) Sealed in the following solution at the indicated conditions:

| | Grams/liter |
|---|---|
| Nickel acetate | 5 |
| Cobalt acetate | 1 |
| Boric acid | 5 |
| Desugared calcium lignosulfonate | 5 |
| Balance water. | |

Temperature—195° F.

Time—15 minutes for coatings produced in 15–30 minutes anodizing; 20 minutes for coatings produced in 30–45 minutes anodizing.

pH—5.7

(10) Rinsed in warm water at a temperature of 120° F.

(11) Dry.

The colored aluminum product of the present invention is characterized by a dense anodic coating. For example, the products set forth in Table V generally are found to have an oxide coating weighing not less than about 20 milligrams per square inch per side of surface and the oxide coating generally is at least .0005 inch thick.

As used herein, the term "aluminum" is meant to cover high purity aluminum, commercial purity aluminum and aluminum alloys.

It will be understood that various changes, omissions and additions may be made to this invention without departing from the spirit and scope thereof as set forth in the appended claims.

All percentages in the claims are by weight of the total electrolyte.

What is claimed is:

1. The method of forming colored coatings on aluminum electrolytically comprising the steps of subjecting said aluminum to anodic oxidation for a period of time of from 1 to 150 minutes at an initial current density of from about 10 to 100 a.s.f. and a voltage of from about 20 to 120 volts in an aqueous solution consisting essentially of from 5 to 50% sulfoalicylic acid, at least one substance selected from the group consisting of metal sulfates and sulfuric acid in an amount equivalent to from about 0.1 to 4% sulfuric acid and the balance water, said solution being maintained at a temperature of from about 55 to 85° F., maintaining said initial current density approximately constant until a selected maximum voltage is reached at which voltage a coating of a desired color is obtained, and thereafter maintaining said selected maximum voltage approximately constant until said anodic oxidation forms a coating of a desired thickness.

2. An anodized aluminum article prepared by the method of claim 1.

3. The method of forming colored coatings on aluminum electrolytically comprising the steps of subjecting said aluminum to anodic oxidation for a period of time of from 10 to 60 minutes at an initial current density of from about 20 to 30 a.s.f. and a voltage from about 25 to about 70 volts in an aqueous solution consisting essentially of from 7 to 15% sulfosalicy[c]lic acid, from 0.1 to about 1% sulfuric acid and the balance water, said solution being maintained at a temperature of from about 70 to 85° F., maintaining said initial current density approximately constant until a selected maximum voltage is reached at which voltage a coating of a desired color is obtained and thereafter maintaining said selected maximum voltage approximately constant until said anodic oxidation forms a coating of a desired thickness.

4. The method of claim 3 wherein said aqueous solution consists essentially of 10% sulfosalicy[c]lic acid, 0.5% sulfuric acid and the balance water.

*5. A method of forming colored coatings on aluminum electrolytically comprising the steps of subjecting said aluminum to anodic oxidation for a period of time of from about 1 to 150 minutes at a substantially constant current density within the range of 10 to 100 a.s.f. in an aqueous solution consisting essentially of from 5–15% sulfosalicylic acid, at least one substance selected from the group consisting of metal sulfates and sulfuric acid in an amount equivalent to from about 0.1 to about 4% sulfuric acid and the balance water, and maintaining said solution at a temperature of from about 55° to 85° F., and the said current density substantially constant, until a coating of the desired color and thickness has been formed.*

*6. The method of forming colored coatings on aluminum electrolytically comprising the steps of subjecting said aluminum to anodic oxidation for a period of time of from about 10 to 60 minutes at a substantially constant current density within the range of from about 20 to 100 a.s.f. in an aqueous solution consisting essentially of from about 5–15% sulfosalicylic acid, from 0.1 to about 1% sulfuric acid and the balance water, and maintaining said solution at a temperature of from about 70° to 85° F., and the said current density substantially constant, until a coating of the desired color and thickness has been formed.*

*7. The method of forming colored coatings on aluminum electrolytically comprising the steps of subjecting said aluminum to anodic oxidation for a period of time of from about 10 to 60 minutes at a substantially constant current density within the range of from about 20 to 30 a.s.f. in an aqueous solution consisting essentially of from about 7–15% sulfosalicylic acid, from 0.1 to about 4% sulfuric acid and the balance water, and maintaining said solution at a temperature of from about 55° to 85° F., and the said current density substantially constant, until a coating of the desired color and thickness has been formed.*

References Cited in the file of this patent or the original patent

UNITED STATES PATENTS

| | | |
|---|---|---|
| 2,233,785 | Korpium | Mar. 4, 1941 |
| 2,260,278 | Schenk | Oct. 21, 1941 |

FOREIGN PATENTS

| | | |
|---|---|---|
| 657,902 | Germany | Mar. 16, 1938 |